May 16, 1944.  R. N. KIRCHER  2,349,099
SERVING BOWL
Filed May 19, 1941
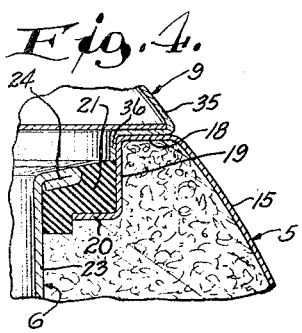
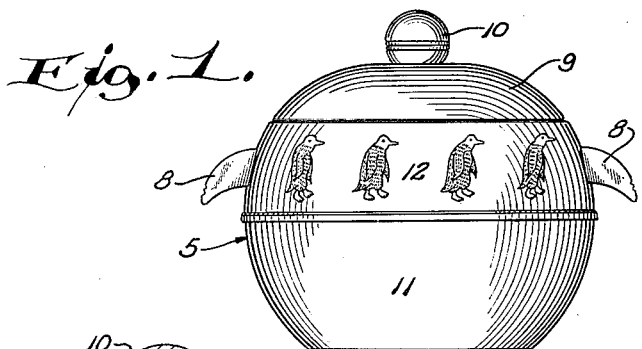
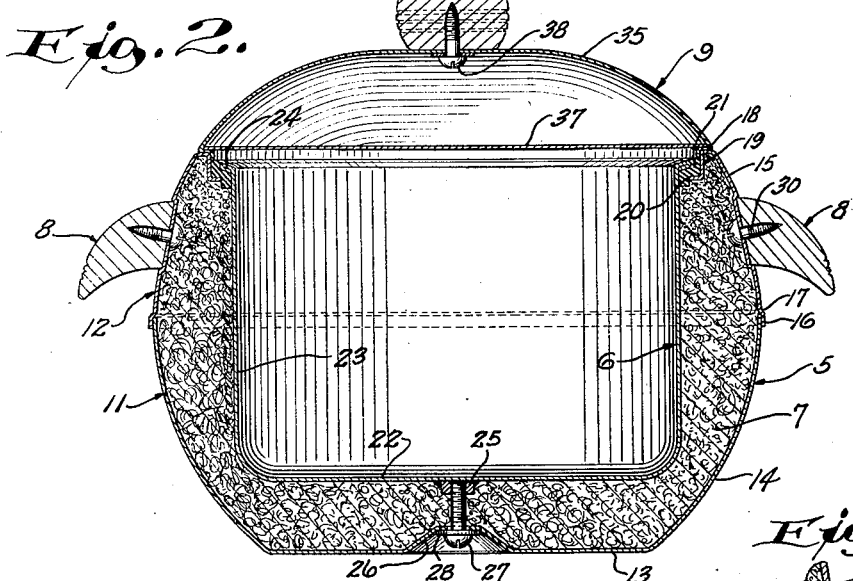
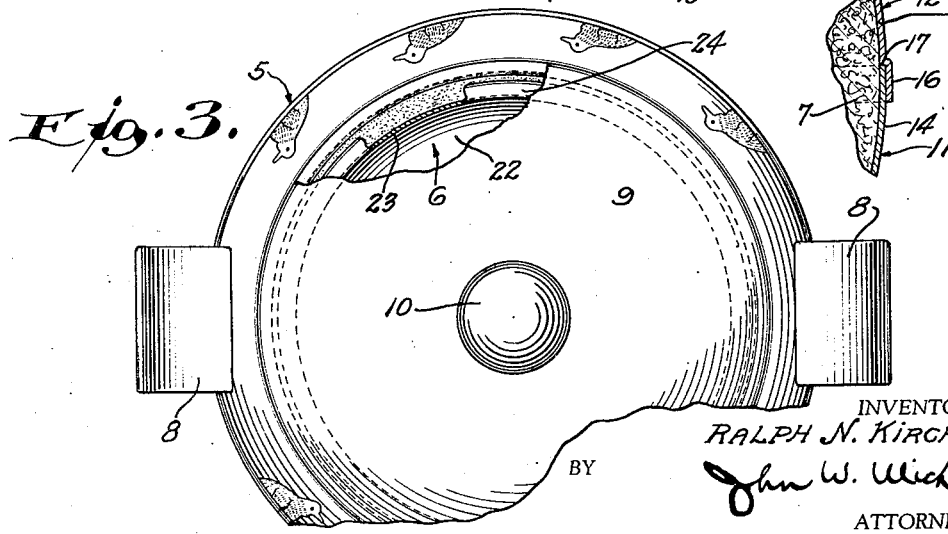
INVENTOR.
RALPH N. KIRCHER.
BY John W. Michael
ATTORNEY.

Patented May 16, 1944

2,349,099

UNITED STATES PATENT OFFICE 2,349,099

SERVING BOWL

Ralph N. Kircher, West Bend, Wis., assignor to West Bend Aluminum Company, West Bend, Wis., a corporation of Wisconsin Application May 19, 1941, Serial No. 394,182

1 Claim. (Cl. 220—15)

This invention relates to an improvement in serving bowls for use in serving foods, beverages, soups, dressings, ice cubes, and the like, and especially designed and adapted to insulate the substances contained therein from the temperature of the environment of the bowl whereby to maintain the substances either hot or cold over a desirable period of time.

An object of the invention is to provide a serving bowl of this character, which is attractive and ornamental in appearance, which is light, well-balanced, and easily handled although having the desired heat-insulating properties, and which may be readily and economically manufactured from materials and by means of facilities ordinarily available.

Other objects and advantages reside in certain novel features of the construction, arrangement, and combination of parts, which will be hereinafter more fully described and particularly pointed out in the appended claim, reference being had to the accompanying drawing forming a part of this specification, and in which:

Figure 1 is a view in side elevation showing a serving bowl embodying the present invention;

Figure 2 is a view thereof in transverse, diametric, vertical cross section;

Figure 3 is a fragmentary view in top plan with parts broken away and shown in section for the sake of illustration;

Figure 4 is a fragmentary view in section taken on the same plane as Figure 2 but showing on an enlarged scale the manner in which the inner receptacle is suspended on the shell and the manner in which the lid or cover is interfitted with the shell; and Figure 5 is a similar fragmentary view showing how the sections of the outer shell are telescoped or interfitted.

Referring to the drawing, it will be seen that a serving bowl constructed in accordance with the present invention comprises generally an outer shell 5, an inner receptacle 6 disposed within and spaced from the outer shell and insulated therefrom by heat-insulating material 7. Diametrically opposite handles 8 are attached to the outer shell adjacent its upper end. A cover or lid, designated generally at 9, is provided for the upper open end of the bowl and is equipped with a knob or handle 10.

The outer shell 5 comprises a lower section 11 and an upper section 12. These sections 11 and 12 may be constituted of any suitable material. Preferably, however, they are drawn from sheet aluminum and have their outer surfaces highly polished or finished so as to provide reflecting and heat-repellent outer surfaces. The lower section 11 is made up of a bottom 13 and an outwardly flaring or bowl-like body portion 14. The upper section 12 has a bowl-like body portion 15 having an outwardly offset annular flange 16 around its lower edge which is designed to snugly telescope or fit over the outer periphery of the bowl-like body 14 of the lower section 11 around its upper edge. At the juncture of the flange 16 and the main portion of the body 15 of the upper section 12, a downwardly facing annular shoulder 17 is formed. This shoulder 17 engages the top of the edge of the lower section 11 to limit the extent to which the sections 11 and 12 are interfitted or telescoped. The upper portion of the body of the bowl-like section 15 is first bent inwardly, as at 18, then downwardly, as at 19, then inwardly, as at 20, to provide a seat for an annular gasket 21 of soft sealing rubber or other suitable cushioning and packing material, the seat being offset inwardly and downwardly from the rim at the upper end of the upper section 12.

The inner receptacle 6 may be constituted of enamel ware, such as enameled sheet steel, and comprises a bottom 22 integral with the lower end of the cylindrical body portion 23. The upper end of the cylindrical body portion 23 is opened, and is formed with outwardly directed annular flange 24 which may be doubled back upon itself, as shown. The flange 24 is snugly fitted in a recess provided therefor in the gasket 21 so as to be in effect countersunk therein, and the flange 24 and the exposed portion of the top of the gasket incline inwardly and downwardly to cause any liquid dropping or collecting thereon to drain back into the inner receptacle 6.

As thus assembled, the inner receptacle 6 is suspended within the outer shell 5 and is out of contact therewith, with a space between the inner receptacle and the outer shell, and this space provides in itself a substantial insulating effect. The insulating effect may, however, be markedly enhanced by filling this space with heat-insulating material 7. The heat-insulating material may be rock wool or any other suitable insulating material.

In order to hold the parts assembled, a nut 25 is welded to the center of the outside of the bottom 22 of the inner receptacle. The bottom 13 of the lower section of the outer shell is displaced upwardly to provide a recess or socket 26 having an aperture at its center. A screw 27 has its shank extended through the aperture of this socket, and the upper end of the screw is interthreaded with the nut 25. A washer 28 is interposed between the head of the screw and the margin of the socket around its opening. When the screw is tightened up, the inner receptacle is pulled downwardly so that its flange 24 has sealing engagement with the gasket 21 and at the same time the flange 16 and shoulder 17 of the upper section 12 of the outer shell are firmly interengaged with the upper edge of the lower section 11 of the outer shell and the parts securely maintained assembled. By constituting the washer 28 of fiber or heat-insulating material, all metal contact or connection between the inner receptacle 6 and outer shell 5 is eliminated and interchange of heat between these parts by conduction is precluded.

The handles 12 may be conveniently constituted of wood, or if desired some other material, such as rubber composition or synthetic rubber or the like, so that they will not become heated. They may be conveniently attached to flats on the upper section 12 of the outer shell by screws 30 which extend through openings in the upper section of the outer shell, have their heads engaged with the margins of the openings on the inside of the shell, and have their shanks threaded into the handles.

The cover or lid 9 comprises a dome-like sheet metal structure 35 having an inset and downwardly directed flange formation 36 around its lower marginal edge designed to interfit with the downwardly extending portion 19 at the upper end of the shell. If desired a plate 37 may be combined with the lid and the space between the lid and plate 37 filled with heat-insulating material, but this is not necessary and may be omitted. The knob 10 is fastened to the center of the top of the lid by means of the screw 38 which functions in the same manner as the screws 30.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claim.

I claim:

A serving bowl comprising a lower section having a bottom and an outwardly flaring upwardly extending bowl-like body portion, an upper section having an outwardly flaring downwardly extending bowl-like body portion and an integral gasket seat offset inwardly and downwardly from the upper rim of the body portion of said upper section, the upper edge of said lower section and the lower edge of said upper section being telescopically interfitted, means limiting the extent of said interfit, a soft sealing gasket positioned in and snugly engaged by said seat, said gasket having a top portion inclining inwardly and downwardly, an inner receptacle having a cylindrical body portion provided with a closed bottom and open top, an outturned flange around the margin of the top of said receptacle and having a top portion sloping inwardly and downwardly, said receptacle being positioned within said bowl with the top margin of said body portion being snugly engaged by said gasket and said flange being seated on said gasket so that the top portion of said gasket and the top of said flange form a drain to the interior of said inner receptacle, the sides and bottom of said receptacle being spaced from said sections and single threaded means extending between the bottom of said inner receptacle and the bottom of said lower section and adjustable from the exterior of said bowl to pull and maintain the inner receptacle in tight sealing engagement with said gasket and thereby to simultaneously clamp said upper section tightly to said lower section.

RALPH N. KIRCHER.